United States Patent
El-Shabani et al.

(10) Patent No.: US 12,436,906 B1
(45) Date of Patent: Oct. 7, 2025

(54) MULTI-THREADED DATA MOVEMENT REQUEST HANDLING

(71) Applicant: Amazon Technologies, Inc., Seattle, WA (US)

(72) Inventors: Mohammad El-Shabani, Redwood City, CA (US); Ron Diamant, Santa Clara, CA (US); Henry Wang, San Bruno, CA (US); Zhao Ma, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 585 days.

(21) Appl. No.: 17/805,428

(22) Filed: Jun. 3, 2022

(51) Int. Cl.
 *G06F 13/28* (2006.01)
 *G06F 9/30* (2018.01)
 *G06F 9/52* (2006.01)
 *G06F 13/16* (2006.01)

(52) U.S. Cl.
 CPC ............ *G06F 13/28* (2013.01); *G06F 9/3009* (2013.01); *G06F 9/522* (2013.01); *G06F 13/1673* (2013.01); *G06F 13/1689* (2013.01)

(58) Field of Classification Search
 CPC ............................ G06F 13/28; G06F 2213/28
 USPC ......................................................... 710/22
 See application file for complete search history.

(56) References Cited

U.S. PATENT DOCUMENTS

| | | | | |
|---|---|---|---|---|
| 4,725,946 A * | 2/1988 | Prange | ....................... | G06F 9/52 710/200 |
| 5,590,378 A * | 12/1996 | Thayer | ................... | G06F 13/28 710/33 |
| 6,055,583 A * | 4/2000 | Robbins | ................... | G06F 13/28 710/22 |
| 6,725,457 B1 * | 4/2004 | Priem | ....................... | G06F 9/52 710/240 |
| 9,298,618 B1 * | 3/2016 | Wentzlaff | ............ | G06F 12/0813 |
| 11,221,979 B1 * | 1/2022 | Borkovic | ............... | G06N 3/045 |
| 2002/0010814 A1 * | 1/2002 | Barry | .................... | G06F 13/126 710/22 |
| 2006/0292292 A1 * | 12/2006 | Brightman | .............. | H04L 49/10 427/66 |
| 2012/0102501 A1 * | 4/2012 | Waddington | .......... | G06F 9/5061 718/105 |
| 2013/0111194 A1 * | 5/2013 | Grochowski | ....... | G06F 9/30101 712/228 |
| 2014/0019664 A1 * | 1/2014 | Simon | ..................... | G06F 13/28 710/308 |
| 2019/0137987 A1 * | 5/2019 | Cella | ................... | G01M 13/045 |
| 2019/0303328 A1 * | 10/2019 | Balski | ................ | G06F 13/1684 |
| 2020/0364088 A1 * | 11/2020 | Ashwathnarayan | .. | G06F 9/5016 |

\* cited by examiner

*Primary Examiner* — Titus Wong

(74) *Attorney, Agent, or Firm* — Weaver Austin Villeneuve & Sampson LLP

(57) ABSTRACT

Multi-threaded data movement request handling techniques are disclosed. The techniques can include performing, by a direct memory access (DMA) engine, one or more data movement operations associated with a data movement phase of a first data movement task, initiating a data movement phase of a second data movement task during a wait period for the sync phase of the first data movement task, initiating the sync phase of the first data movement task following expiration of the wait period for the sync phase of the first data movement task, and performing a sync operation associated with the sync phase of the first data movement task.

20 Claims, 7 Drawing Sheets

US 12,436,906 B1

MULTI-THREADED DATA MOVEMENT REQUEST HANDLING

BACKGROUND

During operation of an integrated circuit device, various components of the integrated circuit device may need to write data to—and/or read data from—system memory. In order to do so, such components may issue data write and/or read requests. The use of a host processor (or processors) to service such requests can result in undesirable latency. In order to avoid such latency, a direct memory access (DMA) engine can be used to directly exchange data between system memory and components writing thereto and/or reading therefrom.

BRIEF DESCRIPTION OF THE DRAWINGS

Various embodiments in accordance with the present disclosure will be described with reference to the drawings, in which.

DETAILED DESCRIPTION

Components of an integrated circuit device that need to read data from system memory and/or write data to system memory can issue data movement requests for placement in a queue. A DMA engine of the integrated circuit device can service the queue, and fulfill the data movement requests therein. Fulfilling any given such data movement request can involve performing one or more data movement operations, and then performing a sync operation to notify the requesting component that the request has been fulfilled and the proper data is stored at the involved memory locations. If the DMA engine can issue reads/writes out of order, a wait period may be needed between completion of the data movement operation(s) and performance of the sync operation to ensure that all of the involved memory locations have been populated with the proper data. As the DMA engine sequentially fulfills a series of data movement requests, the respective wait periods that need to be imposed in conjunction with fulfillment of those requests can collectively represent a significant amount of idle time on the part of the DMA engine. This idle time can constitute a significant drain on performance of the DMA engine and that of the integrated circuit device.

The techniques disclosed herein can enable a DMA engine to honor the wait periods required for fulfillment of data movement requests without being idle during those wait periods. According to the disclosed techniques, a DMA engine can serve multiple data movement request queues and fulfill data movement requests therein via multiple respective data movement request handling threads. For each data movement request handling thread, there can be a respective data movement request queue in which the DMA engine can place a given data movement request in order to allocate the data movement request to that data movement request handling thread. In conjunction with fulfilling data movement requests, the DMA engine can alternate/rotate among various data movement request queues, enabling it to perform data movement operations associated with some data movement tasks during wait periods associated with other data movement tasks. This can advantageously reduce idle time of the DMA engine and boost the performance of the DMA engine and that of the integrated circuit device that it serves.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
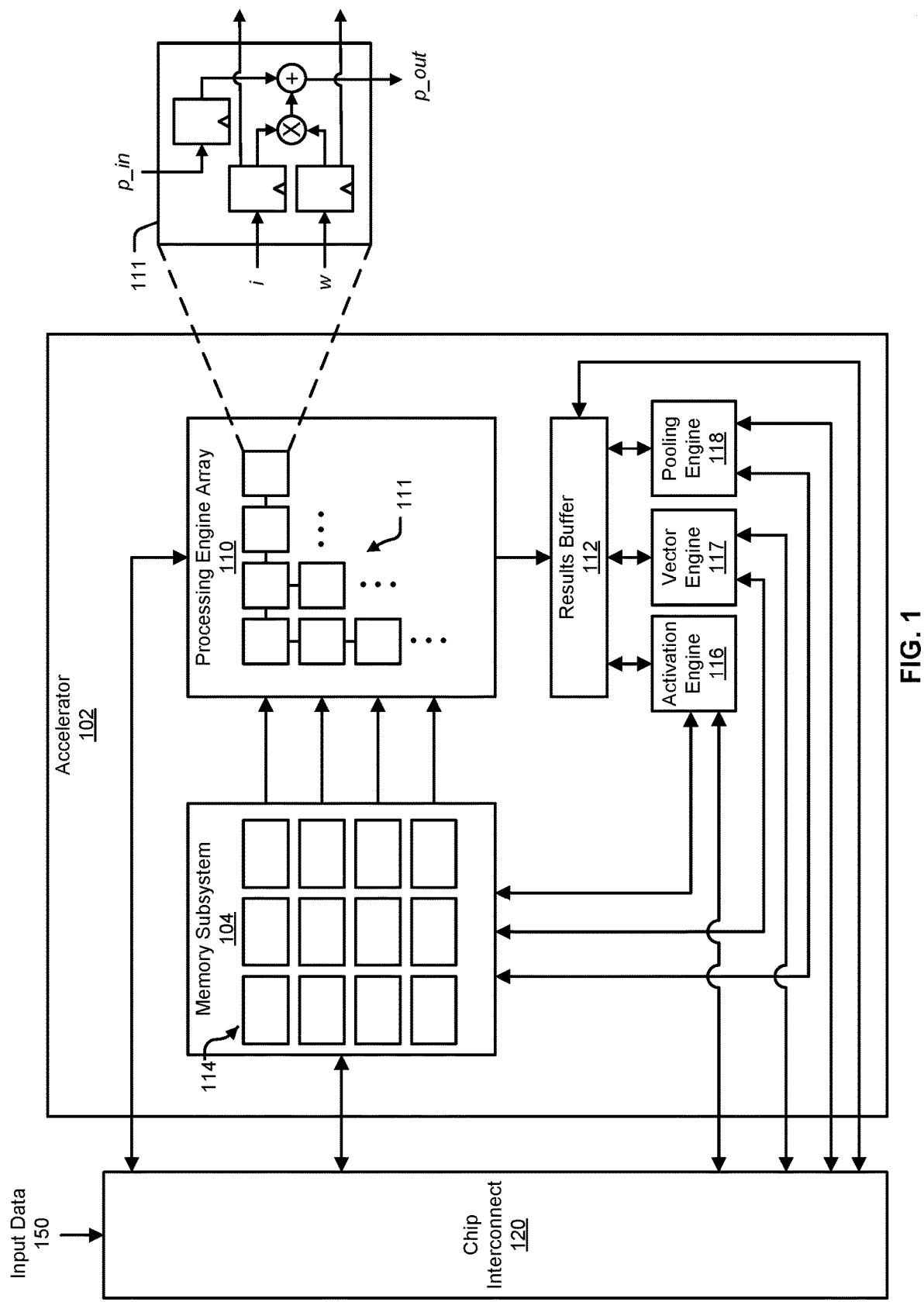
FIG. 1 is a block diagram illustrating an example of an integrated circuit device.

FIG. 1 is a block diagram illustrating an integrated circuit device including an accelerator 102. In various examples, the accelerator 102, for a set of input data (e.g., input data 150), can execute computations using a processing engine array 110, an activation engine 116, a vector engine 117, and/or a pooling engine 118. In some examples, the example accelerator 102 may be an integrated circuit component of a processor, such as a neural network processor. The processor may have other integrated circuit components, including additional accelerator engines.

In various implementations, the memory subsystem 104 can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the vector engine 117, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116, the vector engine 117, and the pooling engine 118 can include multiple execution channels, each of which can be separate memory clients. The memory banks 114 can be implemented, for example, using static random access memory (SRAM).

In various implementations, the memory subsystem 104 can include control logic. The control logic can, for example, keep track of the address spaces of each of the memory banks 114, identify memory banks 114 to read from or write to, and/or move data between the memory banks 114. In some implementations, memory banks 114 can be hardwired to particular clients. For example, a set of memory banks 114 can be hardwired to provide values to the rows of the processing engine array 110, with one memory bank servicing each row. As another example, a set of memory banks can be hard wired to receive values from columns of the processing engine array 110, with one memory bank receiving data for each column.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111, arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 128 rows, or some other number of columns and/or rows.

An example of a processing engine 111 is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above can include a partial sum, p_in, provided either from another processing engine 111 or from a previous round of computation by the processing engine array 110. When starting a computation for a new set of input data, the top row of the processing engine array 110 can receive a fixed value for p_in, such as zero. As illustrated by this example, i and w are multiplied together and the result is summed with p_in to produce a new partial sum, p_out, which can be input into another processing engine 111. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118.

Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

In some implementations, the accelerator 102 can further include a vector engine 117. Vector engine 117 is a compute engine that can perform computations and manipulations on values stored in memory subsystem 104 and/or results buffer 112 such as values representing matrices of input values, weight values, intermediate results, etc. Vector engine 117 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 117 can operate in parallel and/or simultaneously. In some examples, the vector engine 117 can be bypassed or be omitted.

Herein, the activation engine 116, the vector engine 117, and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116, the vector engine 117, and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Figure 2:
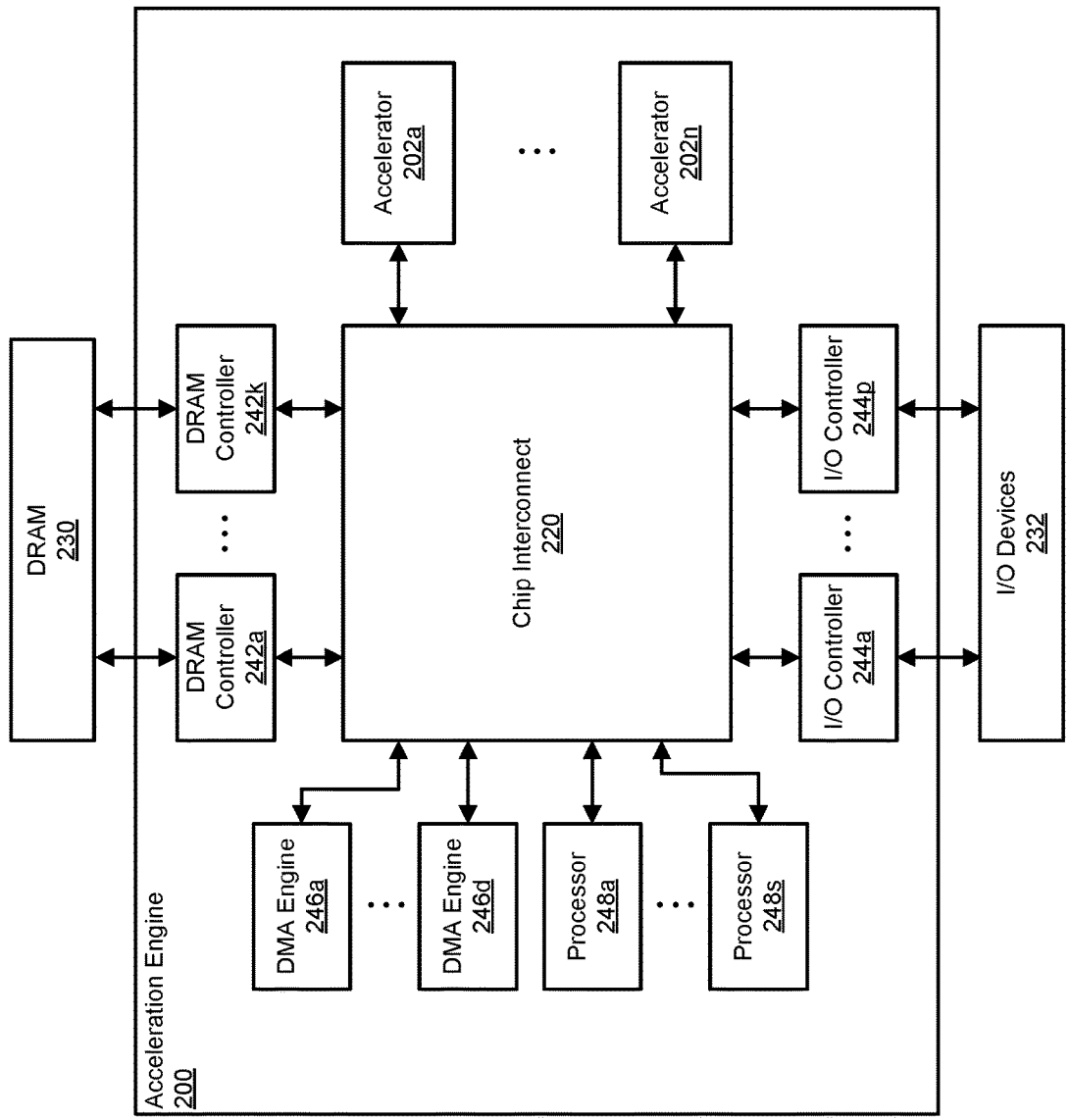
FIG. 2 includes a block diagram that illustrates an example of an acceleration engine.

FIG. 2 includes a block diagram that illustrates an example of an acceleration engine 200 that can perform multi-threaded data movement request handling. The acceleration engine 200 is an example of an integrated circuit device that can include one or more accelerators 202a-202n that may be similar to the accelerator 102 illustrated in FIG. 1.

In the example of FIG. 2, the acceleration engine 200 includes multiple accelerators 202a-202n, each of which can perform a set of operations. In various examples, the accelerators 202a-202n are for particular types of operations, so that the accelerators 202a-202n can perform the operations much faster than when similar operations are performed by a general-purpose processor. In various examples, to perform a set of operations, input data on which the operations are to be performed must first be moved into the accelerators 202a-202n. Additionally, in some cases, program code is also moved into the accelerators 202a-202n, which programs the operations that the accelerators 202a-202n will perform on the data. In the illustrated example, the acceleration engine 200 includes n accelerators 202a-202n. Examples of accelerators that can be included in the acceleration engine 200 include graphics accelerators, floating point accelerators, neural network accelerators, and others. In various examples, the accelerators 202a-202n can each be the same (e.g., each of the accelerators 202a-202n is a graphics accelerator) or can be different (e.g., the accelerators 202a-202n include a graphics accelerator, a floating point accelerator, and neural network accelerator).

The example acceleration engine 200 further includes DRAM controllers 242a-242k for communicating with an external memory. The external memory is implemented, in this example, using DRAM 230. In the illustrated example, the acceleration engine 200 includes k DRAM controllers 242a-242k, each of which may be able to communicate with an independent set of banks of DRAM. In other examples, other types of RAM technology can be used for the external memory. The DRAM controllers 242a-242k can also be referred to as memory controllers.

In various examples, input data and/or program code for the accelerators 202a-202n can be stored in the DRAM 230. Different programs can cause the accelerators 202a-202n to perform different operations. For example, when one of the accelerators is a neural network accelerator, one program can configure the neural network accelerator to perform speech recognition while another program can configure the neural network accelerator to perform image recognition. In various examples, different accelerators 202a-202n can be programmed with different programs, so that each performs a different set of operations. In various examples, the processors 248a-248s can manage moving of program code from the DRAM 230 to the accelerators 202a-202n.

The example acceleration engine 200 further includes I/O controllers 244a-244p for communicating with I/O devices 232 in the system. The acceleration engine 200 can communicate with I/O devices over, for example, a processor bus. In some examples, the processor bus can be implemented using Peripheral Component Interconnect (PCI) and/or a variation of the PCI bus protocol. The processor bus can connect the acceleration engine 200 to I/O devices such as, for example, input and output devices, memory controllers, storage devices, and/or network interface cards, among other things. In some examples, the I/O controllers 244a-244p can enable the acceleration engine 200 to act as an I/O device for a host processor. For example, the acceleration engine 200 can be the recipient of input data from the host processor, and a command indicating an operation to be performed on the input data (e.g., a particular computation or analysis). In the illustrated example, the acceleration engine 200 includes p I/O controllers 244a-244p, each of which may include a separate root complex and may communicate with a separate set of I/O devices 232. In other examples, other standardized bus protocols, such as Ultra Path Interconnect (UPI) can be used for the host bus. In other examples, a proprietary bus protocol can be used.

Movement of data in the acceleration engine 200 can be managed by one or more processors 248a-248s, which can also be referred to as data management processors. In the example of FIG. 2, the acceleration engine 200 includes s processors 248a-248s incorporated into the device (e.g., on the same silicon die). In other examples, the processors 248a-248s can be external to the acceleration engine 200 (e.g., on a different die and/or in a different package). In some examples, the processors 248a-248s can manage the movement of data from I/O devices 232 to the accelerators 202a-202n or the DRAM 230. For example, input data may be located at an I/O device 232 or in processor memory, and the processors 248a-248s can move the input from the I/O device 232 or processor memory into an accelerator or into DRAM 230. As another example, program code for the accelerators 202a-202n may be located on an I/O device 232 or in processor memory.

The example acceleration engine 200 further includes DMA engines 246a-246d that can move data between the accelerators 202a-202n, DRAM controllers 242a-242k, and I/O controllers 244a-244p. In the illustrated example, the acceleration engine 200 includes d DMA engines 246a-246d. In some implementations, the DMA engines 246a-246d can be assigned to specific tasks, such as moving data from the DRAM controllers 242a-242d to the accelerators 202a-202n, or moving data between the I/O controllers 244a-244p and the accelerators 202a-202n. These tasks can be assigned, for example, by enqueueing descriptors with the DMA engines 246a-246d, where a descriptor identifies an address for a block of data and an operation (e.g., a read or a write) to perform. A descriptor, for example, can direct a DMA engine to instruct a DMA controller to read a block of data from DRAM 230. A descriptor can, as a further example, instruct the DMA engine to write data, read by the DMA controller, to an accelerator. Further descriptors can be used to move data from an accelerator to DRAM 230.

In various examples, each of the processors 248a-248s can be responsible for managing the data movement for a different accelerator. In some examples, a processor may manage the data movement for more than one accelerator. Similarly, in various examples, each of the processors 248a-248s can be assigned to one or more DMA engines 246a-246d. In these and other examples, associations between processors 248a-248s, accelerators 202a-202n, and DMA engines 246a-246d are determined by program code being executed by each respective processor.

In the example acceleration engine 200, the various components can communicate over a chip interconnect 220. The chip interconnect 220 primarily includes wiring for routing data between the components of the acceleration engine 200. In some cases, the chip interconnect 220 can include a minimal amount of logic, such as multiplexors to control the direction of data, flip-flops for handling clock domain crossings, and timing logic.

Figure 3:
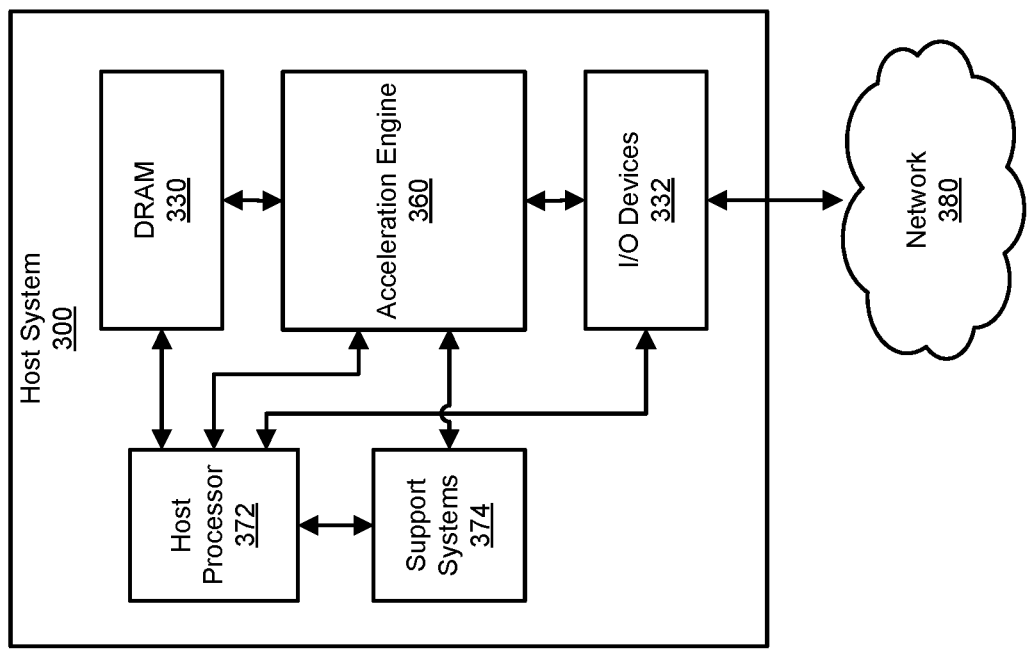
FIG. 3 includes a block diagram that illustrates an example of a host system.

FIG. 3 includes a block diagram that illustrates an example of a host system 300 in which an acceleration engine 360 can be used. The acceleration engine 360 of FIG. 3 is an example of a device that can include one or more accelerators such as is illustrated in FIG. 2. The example host system 300 of FIG. 3 includes the acceleration engine 360, a host processor 372, DRAM 330 or processor memory, I/O devices 332, and support systems 374. In various implementations, the host system 300 can include other hardware that is not illustrated here.

The host processor 372 is a general-purpose integrated circuit that is capable of executing program instructions. In some examples, the host processor 372 can include multiple processing cores. A multi-core processor may include multiple processing units within the same processor. In some examples, the host system 300 can include more than one host processor 372. In some examples, the host processor 372 and the acceleration engine 360 can be one chip, such as, one or more integrated circuits within the same package.

In various examples, the host processor 372 can communicate with other components in the host system 300 over one or more communication channels. For example, the host system 300 can include a host processor bus, which the host processor 372 can use to communicate with the DRAM 330, for example. As another example, the host system 300 can include an I/O bus, such as a PCI-based bus, over which the host processor 372 can communicate with the acceleration engine 360 and/or the I/O devices 332, for example. In various examples, the host system 300 can, alternatively or additionally, include other communication channels or busses, such as serial busses, power management busses, storage device busses, and so on.

In some examples, software programs executing on the host processor 372 can receive or generate input for processing by the acceleration engine 360. In some examples, the programs can select an appropriate neural network to execute for a given input. For example, a program may be for language translation, and can select one or more neural networks capable of speech recognition and/or machine translation. In these and other examples, the programs can configure the acceleration engine 360 with the neural network to execute, and/or can select a neural network processing engine on the acceleration engine 360 that has previously been configured to execute the desired neural network. In some examples, once the acceleration engine 360 has started an inference on input data, the host processor 372 can manage the movement of data (such as weights, instructions, intermediate results, results of conditional layers, and/or final results) into or out of the acceleration engine 360.

In some examples, a software program that is using the acceleration engine 360 to conduct an inference can read the result from a conditional layer from the acceleration engine 360 and/or from a storage location, such as in DRAM 330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 330 is memory that is used by the host processor 372 for storage of program code that the host processor 372 is in the process of executing, as well as values that are being operated on. In some examples, the data for a neural network (e.g., weight values, instructions, and other data) can be all or partially stored in the DRAM 330. DRAM is a common term for processor memory, and though DRAM is volatile memory, processor memory can be volatile and/or non-volatile. Though not illustrated here, the host system 300 can include other volatile and non-volatile memories for other purposes. For example, the host system 300 can include a Read-Only Memory (ROM) that stores boot code for booting the host system 300 at power on, and/or Basic Input/Output System (BIOS) code.

Though not illustrated here, the DRAM 330 can store instructions for various programs, which can be loaded into and be executed by the host processor 372. For example, the DRAM 330 can be storing instructions for an operating system, one or more data stores, one or more application programs, one or more drivers, and/or services for implementing the features disclosed herein.

The operating system can manage and orchestrate the overall operation of the host system 300, such as scheduling tasks, executing applications, and/or controller peripheral devices, among other operations. In some examples, a host system 300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 300. For example, some drivers can provide communication between the operating system and peripheral devices or I/O devices 332. Alternatively or additionally, some drivers may provide communication between application programs and the operating system, and/or application programs and peripheral devices accessible to the host system 300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 332 can include hardware for connecting to user input and output devices, such as keyboards, mice, pens, tablets, voice input devices, touch input devices, displays or monitors, speakers, and printers, among other devices. The I/O devices 332 can also include storage drives and/or network interfaces for connecting to a network 380. For example, the host system 300 can use a network interface to communicate with storage devices, user terminals, other computing devices or servers, and/or other networks, among various examples.

In various examples, one or more of the I/O devices 332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 300 or may be in an external enclosure. A storage device can be fixed (e.g., attached by screws) or removable (e.g., having a physical release mechanism and possibly a hot-plug mechanism).

Storage devices, the DRAM 330, and any other memory component in the host system 300 are examples of computer-readable storage media. Computer-readable storage media are physical mediums that are capable of storing data in a format that can be read by a device such as the host processor 372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 332 can be PCI-based devices. In these examples, a PCI-based I/O device includes a PCI interface for communicating with the host system 300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 374 can include hardware for coordinating the operations of the acceleration engine 360. For example, the support systems 374 can include a microprocessor that coordinates the activities of the acceleration engine 360, including moving data around on the acceleration engine 360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 372. In some examples, the program executed by the microprocessor is stored on the hardware of microprocessor, or on a non-volatile memory chip in the host system 300. In some examples, the microprocessor and the acceleration engine 360 can be on chip, such as one integrated circuit on the same die and in the same package.

In some examples, the support systems 374 can be responsible for taking instructions from the host processor 372 when programs executing on the host processor 372 request the execution of a neural network. For example, the host processor 372 can provide the support systems 374 with a set of input data and a task that is to be performed on the set of input data. In this example, the support systems 374 can identify a neural network that can perform the task, and can program the acceleration engine 360 to execute the neural network on the set of input data. In some examples, the support systems 374 only needs to select an appropriate neural network processing engine of the neural network processor. In some examples, the support systems 374 may need to load the data for the neural network onto the acceleration engine 360 before the acceleration engine 360 can start executing the neural network. In these and other examples, the support systems 374 can further receive the output of executing the neural network, and provide the output back to the host processor 372.

In some examples, the operations of the support systems 374 can be handled by the host processor 372. In these examples, the support systems 374 may not be needed and can be omitted from the host system 300.

In various examples, the host system 300 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 4:
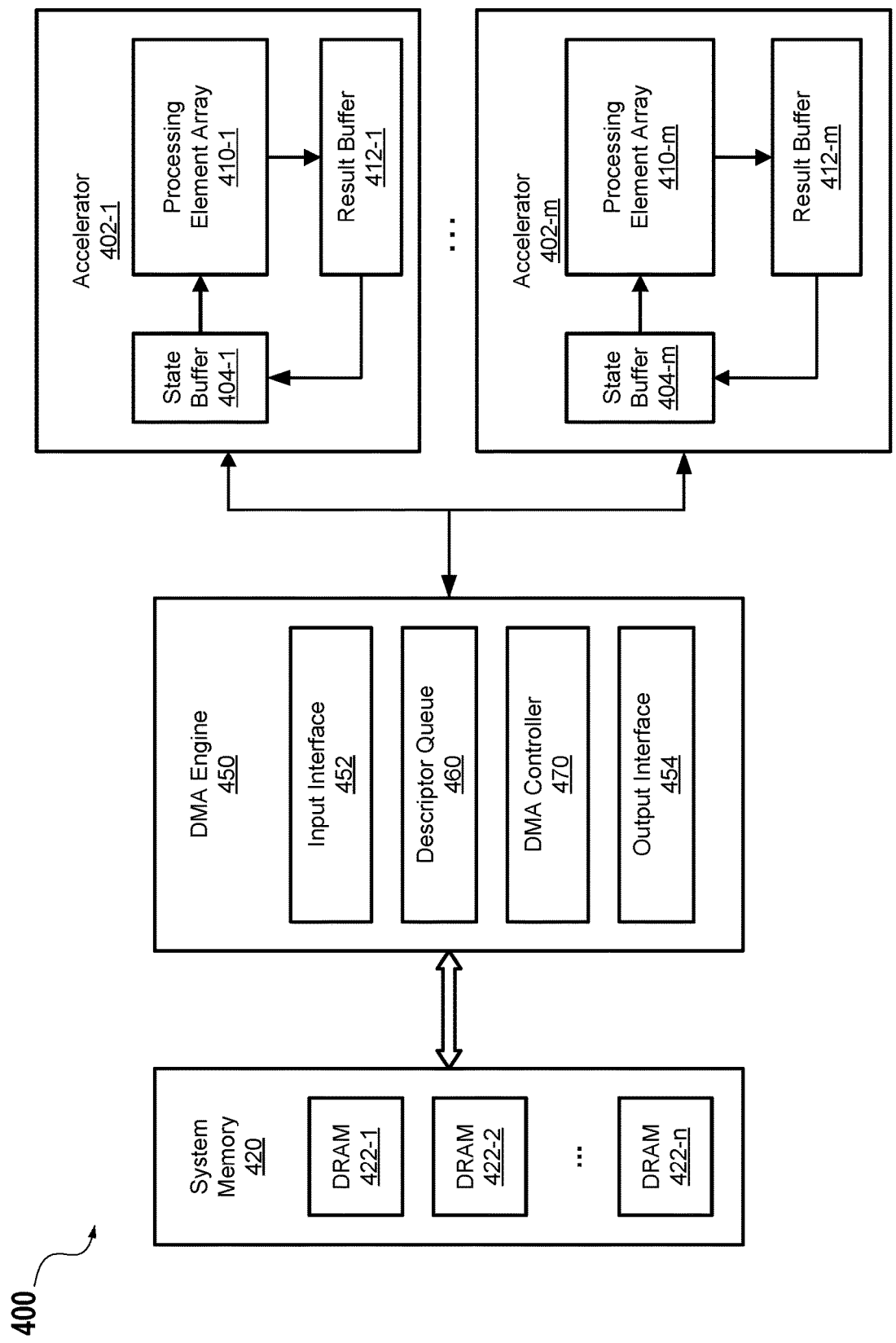
FIG. 4 is a block diagram illustrating an example of a computing system.

FIG. 4 illustrates an example of a computing system 400 according to certain embodiments. In the illustrated example, computing system 400 includes a DMA engine 450, system memory 420, and one or more accelerators 402-1 to 402-*m*. Computing system 400 may include other components not specifically shown, such as a host processor. Accelerators 402-1 may be a neural network accelerator (e.g., a neural network processor or tensor processing unit), and may include a processing element array 410-1 (e.g., a systolic array), a state buffer 404-1, and a result buffer 412-1 as described above with respect to FIG. 1. Processing element array 410-1 may include an array of processing elements arranged in rows and columns. Each processing element is capable of performing a multiply-and-add operation. State buffer 404-1 may be used to store input data such as feature map values and weight values for processing element array 410-1, and/or may be used to store intermediate outputs that may be used in subsequent layers. During operation, the input data may be shifted into processing element array 410-1 from state buffer 404-1 along the rows of the array. The computation results of the processing elements are accumulated along the column direction. The output data of the columns (e.g., partial sum) may be stored in result buffer 412-1, and may be further processed by other processing engines (such as a pooling engine and/or activation engine, not shown in FIG. 4) and saved to state buffer 404-1. Other accelerators in computing system 400 such as accelerator 402-$m$ may have a similar architecture as accelerator 402-1 described above.

In many instances, tensors processed by computing system 400 may have thousands or even millions of elements. Because not all elements of a tensor can fit within accelerators 402-1 to 402-$n$ at the same time, system memory 420 can be used to store data that are not currently being processed in accelerators 402-1 to 402-$m$. System memory 420 can also be used to facilitate data exchanges between accelerators 402-1 to 402-$m$ (e.g., for gradient exchange during training). As computations are carried out, data used by accelerators 402-1 to 402-$m$ may be transferred from system memory 420 into the corresponding accelerator, and data not being used by accelerators 402-1 to 402-$m$ can be transferred from the respective accelerator to system memory 420. System memory 420 can be implemented using one or more DRAM devices 422-1 to 422-$n$ and/or other types of memory devices. In other implementations, system memory can be implemented, for example, using static random access memory (SRAM), flash memory, 3D cross-point memory, or any combination thereof.

In some implementations, data transfers between system memory 420 and other components of computing system 400 may involve a host processor (not shown) to issue read and write commands to system memory 420. Such memory accesses through a host processor may use processing time of the host processor and may incur unnecessary latency, especially when the host processor is not a consumer or generator of the data being accessed. To bypass the host processor, DMA engine 450 can be used to directly exchange data between system memory 420 and accelerators 402-1 to 402-$m$.

DMA engine 450 may include a DMA controller 470, a descriptor queue 460, an input interface 452, and an output interface 454. Descriptor queue 460 can be implemented as, for example, a circular buffer or ring queue, and can be configured to store a set of memory descriptors used by DMA engine 450 to exchange data between system memory 420 and other components of computing system 400. For example, when an accelerator 402-$m$ has data to store in system memory 420 or is requesting data from system memory 420, a memory descriptor providing a source address and a destination address can be placed in descriptor queue 460 to initiate the transfer. A memory descriptor may also include other information, such as the number of elements to transfer, data size, transfer unit, transfer type, and the like. In some implementations, DMA engine 450 may include multiple descriptor queues. For example, DMA engine 450 may include a descriptor queue for writing data into system memory 420 and/or accelerators 402-1 to 402-$m$, and a descriptor queue for reading data from system memory 420 and/or accelerators 402-1 to 402-$m$. In some implementations, DMA engine 450 may implement multiple data transmission channels (e.g., different channels for different components of computing system 400), and each transmission channel may have its own descriptor queue or pair of descriptor queues for both transfer directions. Furthermore, DMA engine 450 may implement a destination descriptor queue that can be used to facilitate multicast operations.

DMA controller 470 may be used to manage the operations of DMA engine 450. For example, DMA controller 470 may maintain head and tail pointers for descriptor queue 460 of DMA engine 450. DMA controller 470 may monitor the number of available entries in descriptor queue 460 to prevent queue overflow. In some implementations, DMA controller 470 may also maintain completion statuses and generate interrupts for components of computing system 400. DMA controller 470 may process the memory descriptors in descriptor queue 460 by reading data from the source designated in the memory descriptor via input interface 452, and writing the data to a target destination designated in the memory descriptor via output interface 454. As such, input interface 452 may issue read operations to obtain the data being transferred, and output interface 454 may issue write operations to place the data into the target destination.

Figure 5:
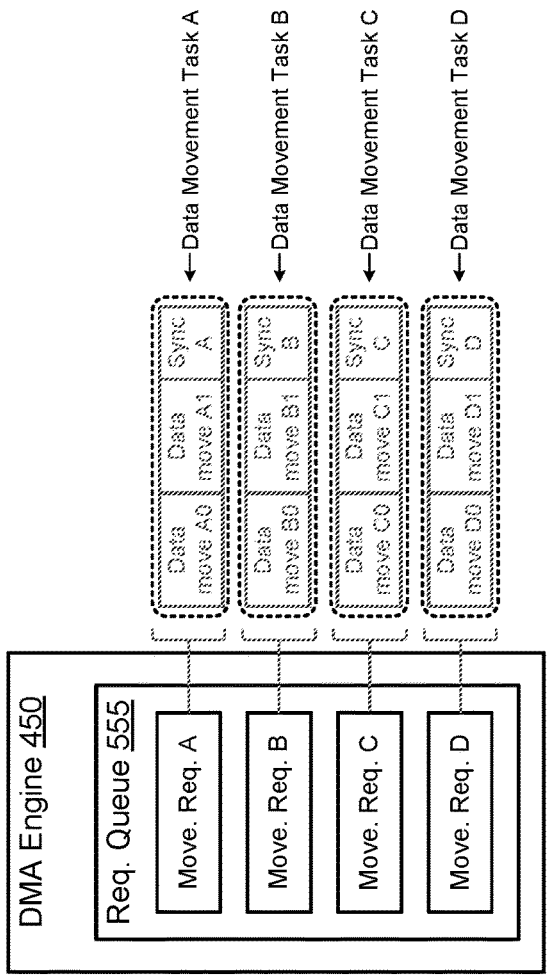
FIG. 5 includes a block diagram illustrating a first example operating environment.
Figure 5:
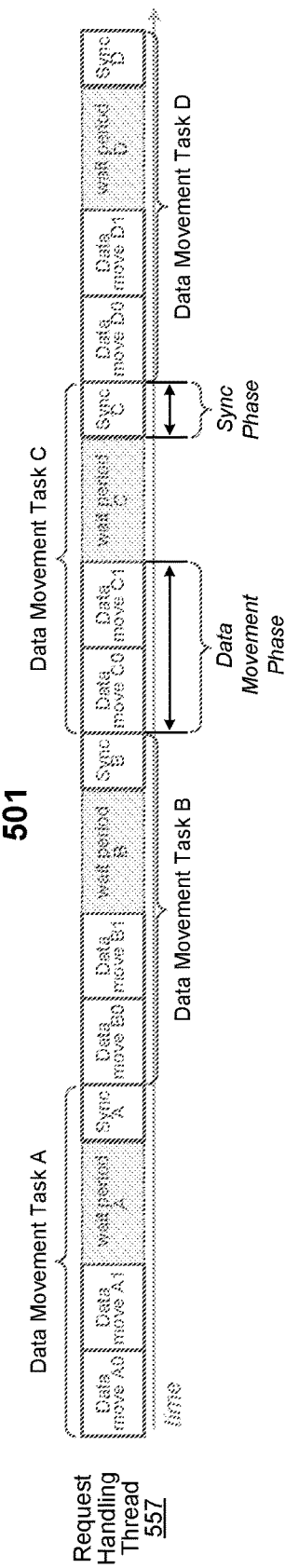

FIG. 5 illustrates an example operating environment 500. In operating environment 500, DMA engine 450 of FIG. 4 serves a data movement request queue 555. In conjunction with serving data movement request queue 555, DMA engine 450 handles data movement requests contained in data movement request queue 555. In some implementations, data movement request queue 555 can be the same as—or similar to—descriptor queue 460 of FIG. 4. In such implementations, the data movement requests contained in data movement request queue 555 can comprise memory descriptors as discussed above with respect to descriptor queue 460.

In the example depicted in FIG. 5, data movement request queue 555 contains four data movement requests: movement request A, movement request B, movement request C, and movement request D. Each one of movement requests A, B, C, and D can have associated with it a respective set of operations to be performed in order to fulfill that data movement request. The set of operations to be performed in order to fulfill a given data movement request can be collectively referred to as a data movement task. In the depicted example, data movement tasks A, B, C, and D comprise the respective sets of operations to be performed in order to fulfill data movement requests A, B, C, and D. Each of data movement tasks A, B, C, and D comprises two data movement operations and a sync operation. For instance, data movement task A comprises data movement operations A0 and A1 and a sync operation A. Thus, in order to fulfill movement request A, DMA engine 450 can perform data movement operation A0, data movement operation A1, and sync operation A. Each of data movement operation A0, data movement operation A1, and sync operation A can be represented using a memory descriptor in data movement request queue 555. It should be understood that a data movement request in other examples may include a different number of data movement operations implemented with a different number of memory descriptors.

As employed herein in reference to a given data movement task, the term "data movement phase" denotes a portion of the data movement task that comprises the movement operation(s) of that data movement task, and the term "sync phase" denotes a portion of the data movement task that comprises the sync operation of that data movement task. For example, with respect to data movement task C (as illustrated in timing flow 501), the data movement phase is a portion of data movement task C comprising data movement operations C0 and C1, and the sync phase is a portion of data movement task C comprising sync operation C.

With respect to any given one of the data movement requests in data movement request queue 555, the data movement operations can generally involve moving data from a source address to a destination address (such as may be indicated, for example, by a memory descriptor as discussed above with respect to descriptor queue 460). The sync operation can generally involve writing to synchronization logic of another engine, such as a processing engine, activation engine, vector engine, or pooling engine of accelerator 102 of FIG. 1 or any of accelerators 402-1 to 402-$m$ of FIG. 4. In some implementations, the synchronization logic can comprise a semaphore, and writing to the synchronization logic can involve modifying the semaphore (e.g., incrementing the semaphore by the value of the write). Completion of the sync operation can indicate to the other engine that the data movement request has been completely fulfilled. The other engine can wait for the synchronization logic to be in a particular state—e.g., for a semaphore to have a particular value-before accessing data moved in conjunction with the data movement request, or accessing memory freed up by the data movement request.

In some implementations, DMA engine 450 may proceed with performing data movement operations without waiting for acknowledgement of preceding operations. For instance, DMA engine 450 may perform data movement operation A0, and then perform data movement operation A1 without waiting for acknowledgment of the success of data movement operation A0. In some implementations, DMA engine 450 may be permitted to issue read/write commands out of order. Such possibilities can necessitate the implementation of a wait period between the completion of the data movement operations of any given data movement request and the sync operation of that data movement request. If DMA engine 450 performs a sync operation for a given data movement request prior to the expiration of an applicable wait period, an engine attempting to access the moved data may instead be provided with other, erroneous data. By waiting for the expiration of the applicable wait period, DMA engine 450 can substantially ensure that the accessing engine is provided with the correct data.

FIG. 5 also illustrates an example timing flow 501. Timing flow 501 depicts timings according to which DMA engine 450 can perform the operations associated with data movement requests A, B, C, and D. More particularly, timing flow depicts timings according to which DMA engine 450 can perform such operations when it fulfills the data movement requests in data movement request queue 555 sequentially, via a data movement request handling thread 557.

As reflected in FIG. 5, fulfilling the data movement requests in data movement request queue 555 using data movement request handling thread 557 involves completing the fulfillment of each data movement request before initiating the fulfillment of the next data movement request. For example, fulfillment of data movement request B is not initiated (via performance of data movement operation B0) until sync operation A is performed to complete the fulfillment of data movement request A. To substantially ensure that engines accessing the data moved in conjunction with data movement operations A, B, C, and D are provided with the correct data, wait periods A, B, C, and D are implemented prior to performance of respective sync operations A, B, C, and D. These wait periods make up a significant portion of the overall amount of time that DMA engine 450 requires to fulfill the data movement requests in data movement request queue 555 using data movement request handling thread 557. As such, if DMA engine 450 sits idle during these wait periods, they can represent a significant degradation on performance.

Figure 6:
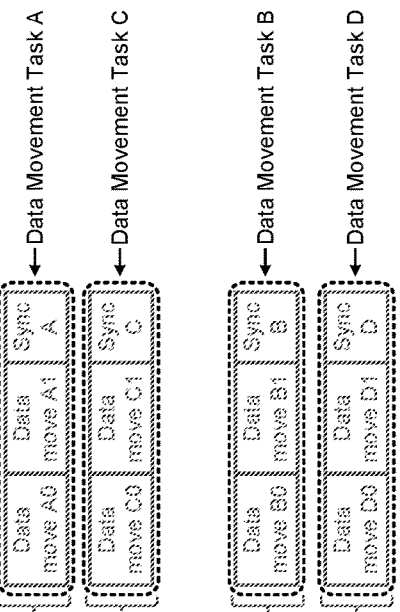
FIG. 6 includes a block diagram illustrating a second example operating environment.
Figure 6:
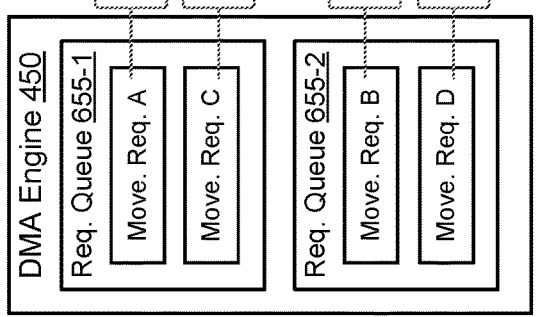
Figure 6:
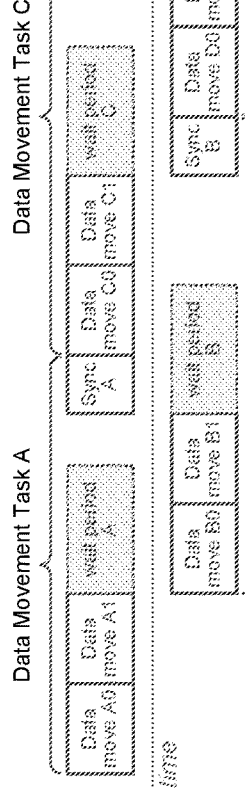
Figure 6:
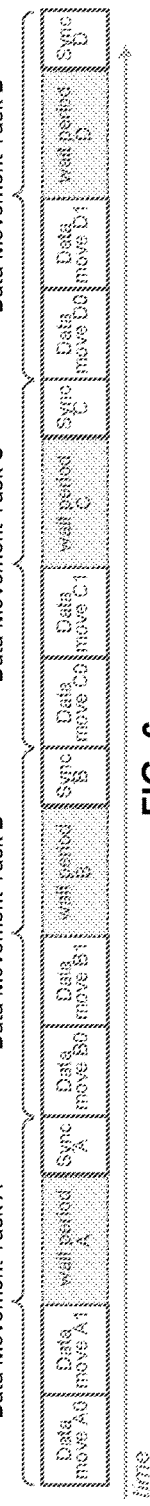

FIG. 6 illustrates an example operating environment 600 that may be representative of the disclosed multi-threaded data movement request handling techniques according to various implementations. In operating environment 600—as in operating environment 500 of FIG. 5—DMA engine 450 handles data movement requests including data movement requests A, B, C, and D. However, in operating environment 600, DMA engine 450 serves two data movement request queues 655-1 and 655-2, and handles data movement requests via two corresponding data movement request handling threads 657-1 and 657-2.

In order to allocate a data movement request to data movement request handling thread 657-1, DMA engine 450 can place that data movement request in data movement request queue 655-1. In order to allocate a data movement request to data movement request handling thread 657-2, DMA engine 450 can place that data movement request in a data movement request queue 655-2. In the example depicted in FIG. 6, DMA engine 450 places data movement requests A and C in data movement request queue 655-1 in order to allocate them to data movement request handling thread 657-1, and places data movement requests B and D in data movement request queue 655-2 in order to allocate them to data movement request handling thread 657-2. Each data movement request queue can be implemented as an individual descriptor queue. In other words, instead of using a descriptor queue to server data movement requests A, B. C. and D as shown in FIG. 5, the implementation of FIG. 6 can use two descriptor queues in place of descriptor queue 555 of FIG. 5.

It is to be appreciated that in some implementations, more than two data movement request handling threads may be implemented, and a respective data movement request queue may be defined for each one. Different numbers of data movement request handling threads may be preferable in different implementations, and a number of data movement request handling threads that is suitable for a given implementation may depend, for example, on the durations of the required wait periods relative to the durations of the data movement operations and sync operations. In some implementations, data movement requests can be allocated to the different threads/queues in a round robin manner.

FIG. 6 also illustrates an example timing flow 601. Timing flow 601 depicts timings according to which DMA engine 450 can perform the operations associated with data movement requests A, B, C, and D when it fulfills the data movement requests in data movement request queue 555 via data movement request handling threads 657-1 and 657-2. For purposes of visual comparison with timing flow 601, timing flow 501 of FIG. 5 is reproduced in FIG. 6.

As reflected in timing flow 601, because DMA engine 450 has multiple data movement request handling threads via which it can fulfill data movement requests, it does not necessarily need to wait for the completion of a given data movement task before initiating the fulfillment of another data movement task. Rather, when a wait period begins for a data movement task being serviced on one data movement request handling thread, DMA engine 450 can activate the other data movement request handling thread and begin performing operations associated with a data movement task (or tasks) being serviced on that other data movement request handling thread. For example, when wait period A of data movement task A begins as data movement task A is serviced on data movement request handling thread 657-1, DMA engine 450 can activate data movement request handling thread 657-2 and perform data movement operations B0 and B1 of data movement task B. Likewise, when wait period B of data movement task B begins as data movement task B is serviced on data movement request handling thread 657-2, DMA engine 450 can activate data movement request handling thread 657-1 and perform sync operation A of data movement task A and data movement operations C0 and C1 of data movement task C.

Thus, as can be confirmed via comparison of timing flow 601 with timing flow 501, the implementation of multiple data movement request handling threads 657-1 and 657-2 enables DMA engine 450 to complete data movement tasks A, B, C, and D more quickly than it can using the single data movement request handling thread 557. Additionally, the implementation of multiple data movement request handling threads 657-1 and 657-2 enables DMA engine 450 to be used more efficiently, as it is not subject to idle periods over the course of data movement task completion as it is when the single data movement request handling thread 557 is used. It should also be noted that when implementing multiple threads/queues, the sync operations of each thread/queue may write to a different semaphore. In other words, each thread/queue can be associated with its own semaphore.

Figure 7:
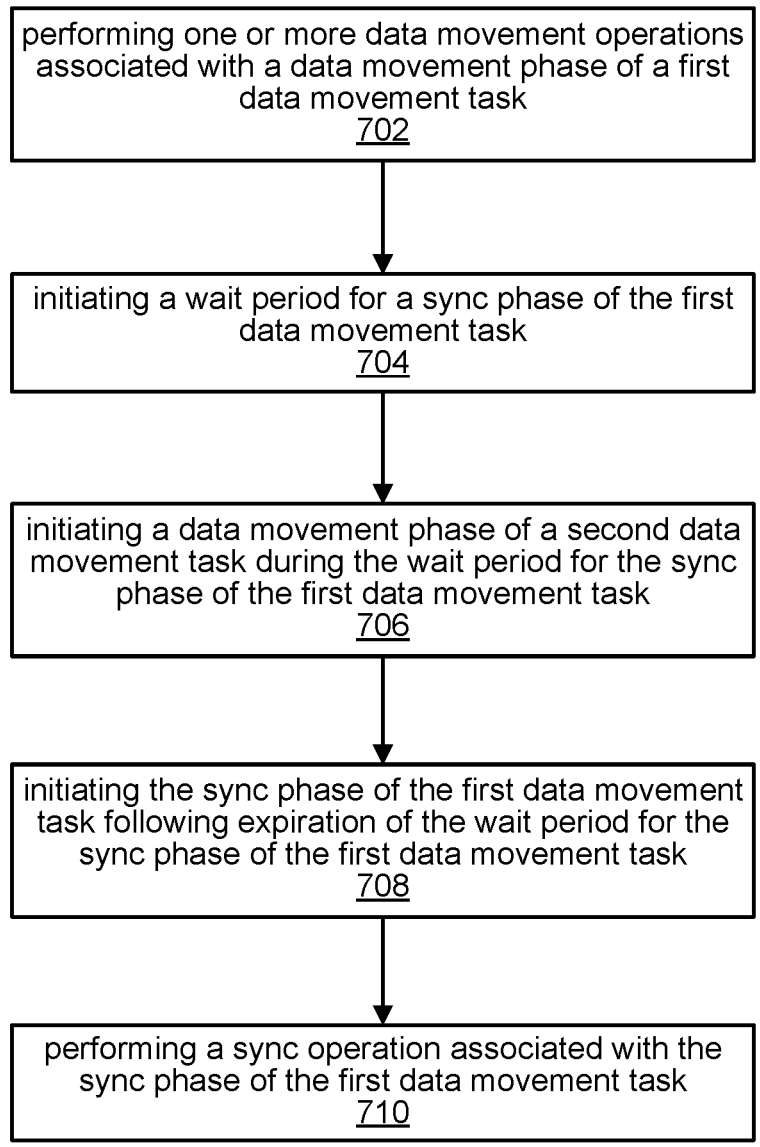
FIG. 7 includes a flowchart illustrating an example of a multi-threaded data movement request handling process.

FIG. 7 includes a flowchart illustrating an example of a multi-threaded data movement request handling process 700. These methods may be implemented by the systems described above, such as for example by computing system 400 using DMA engine 450.

At step 702, the process 700 includes performing one or more data movement operations associated with a data movement phase of a first data movement task. For example, in operating environment 600 of FIG. 6, DMA engine 450 can perform data movement operations A0 and A1 of data movement task A.

At step 704, the process 700 includes initiating a wait period for a sync phase of the first data movement task. For example, in operating environment 600 of FIG. 6, DMA engine 450 can initiate wait period A of data movement task A.

At step 706, the process 700 includes initiating a data movement phase of a second data movement task during the wait period for the sync phase of the first data movement task. For example, in operating environment 600 of FIG. 6, DMA engine 450 can initiate the data movement phase of data movement task B during the wait period A of data movement task A.

At step 708, the process 700 includes initiating the sync phase of the first data movement task following expiration of the wait period for the sync phase of the first data movement task. For example, in operating environment 600 of FIG. 6, following expiration of wait period A, DMA engine 450 can initiate the sync phase of data movement task A. It is worthy of note that the initiation of the sync phase of the first data movement task at step 708 need not necessarily occur immediately following the expiration of the wait period for the sync phase of the first data movement task. For example, in operating environment 600 of FIG. 6, DMA engine 450 can wait until it has completed the data movement phase of data movement task B before initiating the sync phase of data movement task A.

At step 710, the process 700 includes performing a sync operation associated with the sync phase of the first data movement task. For example, in operating environment 600 of FIG. 6, DMA engine 450 can perform the sync operation A associated with the sync phase of data movement task A.

In some implementations, process 700 can include performing one or more data movement operations associated with the data movement phase of the second data movement task, initiating a wait period for a sync phase of the second data movement task, and initiating the sync phase of the first data movement task following expiration of the wait period for the sync phase of the first data movement task and during the wait period for the sync phase of the second data movement task. For example, in operating environment 600 of FIG. 6, DMA engine 450 can perform data movement operations B0 and B1 of data movement task B, initiate wait period B of data movement task B, and initiate the sync phase of data movement task A following expiration of wait period A of data movement task A and during wait period B of data movement task B.

In some implementations, process 700 can include initiating the sync phase of the second data movement task following expiration of the wait period for the sync phase of the second data movement task and performing a sync operation associated with the sync phase of the second data movement task. For example, in operating environment 600 of FIG. 6, DMA engine 450 can initiate the sync phase of data movement task B following expiration of wait period B of data movement task B, and can perform sync operation B of data movement task B.

In some implementations, performing the sync operation associated with the sync phase of the first data movement task can include modifying a first semaphore, and performing the sync operation associated with the sync phase of the second data movement task can include modifying a second semaphore that differs from the first semaphore. For example, in operating environment 600 of FIG. 6, DMA engine 450 can modify (e.g., increment) a first semaphore in conjunction with performing sync operation A of data movement task A, and can modify (e.g., increment) a second semaphore in conjunction with performing sync operation B of data movement task B.

In some implementations, process 700 can include identifying the first data movement task based on a first data movement request, allocating the first data movement request to a first data movement request handling thread, identifying the second data movement task based on a second data movement request, and allocating the second data movement request to a second data movement request handling thread. For example, in operating environment 600 of FIG. 6, DMA engine 450 can identify data movement task A based on data movement request A and allocate data movement request A to data movement request handling thread 657-1, and can identify data movement task B based on data movement request B and allocate data movement request B to data movement request handling thread 657-2.

In some implementations, allocating the first data movement request to the first data movement request handling thread can include placing the first data movement request in a first data movement request queue, and allocating the second data movement request to the second data movement request handling thread can include placing the second data movement request in a second data movement request queue. For example, in operating environment 600 of FIG. 6, allocating data movement request A to data movement request handling thread 657-1 can include placing data movement request A in data movement request queue 655-1, and allocating data movement request B to data movement request handling thread 657-2 can include placing data movement request B in data movement request queue 655-2.

In some implementations, process 700 can include identifying a plurality of data movement tasks based on a plurality of data movement requests comprised in a data movement request queue served by the DMA engine, where the plurality of data movement tasks includes the first data movement task and the second data movement task, the plurality of data movement requests includes the first data movement request and the second data movement request, and each one of the plurality of data movement tasks is identified based on a respective one of the plurality of data movement requests. For example, in operating environment 600 of FIG. 6, DMA engine 450 can identify each one of data movement tasks A, B, C, and D based on a respective one of data movement requests A, B, C, and D.

In some implementations, process 700 can include identifying a third data movement task based on a third data movement request and allocating the third data movement request to a third data movement request handling thread. For example, in operating environment 600 of FIG. 6, DMA engine 450 can identify data movement task C based on data movement request C, and can allocated data movement request C to a data movement request handling thread (not pictured) other than data movement request handling thread 657-1 or data movement request handling thread 657-2.

In some implementations, performing (at step 710) the sync operation associated with the sync phase of the first data movement task can include writing to synchronization logic of a component of an integrated circuit device comprising the DMA engine. For example, in conjunction with performing sync operation A in operating environment 600 of FIG. 6, DMA engine 450 can write to synchronization logic of a component of an integrated circuit device comprising DMA engine 450. In some implementations, the integrated circuit device can be an acceleration engine. For example, in conjunction with performing sync operation A in operating environment 600 of FIG. 6, DMA engine 450 can write to synchronization logic of a component of acceleration engine 200 of FIG. 2. In some implementations, the component can be a processing engine array, activation engine, vector engine, or pooling engine of an accelerator of the integrated circuit device. For example, in conjunction with performing sync operation A in operating environment 600 of FIG. 6, DMA engine 450 can write to a semaphore of an accelerator among accelerators 202a-202n of acceleration engine 200.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for handling data movement requests at a direct memory access (DMA) engine of an integrated circuit device, the computer-implemented method comprising:
   allocating a first data movement request to a first data movement request handling thread by placing the first data movement request in a first data movement request queue, wherein the first data movement request is requesting a first data movement task that includes a first data movement phase having a first set of one or more data movement operations, and a first sync phase having a first sync operation;
   allocating a second data movement request to a second data movement request handling thread by placing the second data movement request in a second data movement request queue, wherein the second data movement request is requesting a second data movement task that includes a second data movement phase having a second set of one or more data movement operations, and a second sync phase having a second sync operation;
   performing, by the DMA engine, the first set of one or more data movement operations;
   during a wait period for the first sync phase, performing, by the DMA engine, the second set of one or more data movement operations; and
   during a wait period for the second sync phase and following the wait period for the first sync phase, initiating, by the DMA engine, the first sync phase and performing the first sync operation.

2. The computer-implemented method of claim 1, comprising:
   following performance of the first sync operation and the wait period for the second sync phase:
   initiating the second sync phase; and
   performing the second sync operation.

3. The computer-implemented method of claim 1, wherein the integrated circuit device is an acceleration engine, wherein performing the first sync operation includes writing to synchronization logic of a component of the acceleration engine, wherein the component is a processing engine array, activation engine, vector engine, or pooling engine of an accelerator of the acceleration engine.

4. The computer-implemented method of claim 3, wherein the synchronization logic includes a semaphore, wherein writing to the synchronization logic includes updating a value of the semaphore.

5. A computer-implemented method for a direct memory access (DMA) engine, the computer-implemented method comprising:
   performing one or more data movement operations in a data movement phase of a first data movement task;
   during a wait period for a sync phase of the first data movement task, initiating a data movement phase of a second data movement task;
   initiating the sync phase of the first data movement task following expiration of the wait period for the sync phase of the first data movement task; and
   performing a sync operation in the sync phase of the first data movement task.

6. The computer-implemented method of claim 5, comprising:
   performing one or more data movement operations in the data movement phase of the second data movement task; and
   initiating the sync phase of the first data movement task following the wait period for the sync phase of the first data movement task and during a wait period for the sync phase of the second data movement task.

7. The computer-implemented method of claim 6, comprising:
   initiating the sync phase of the second data movement task following the wait period for the sync phase of the second data movement task; and
   performing a sync operation in the sync phase of the second data movement task.

8. The computer-implemented method of claim 7, wherein performing the sync operation in the sync phase of the first data movement task includes updating a first value of a first semaphore, and wherein performing the sync operation in the sync phase of the second data movement task includes updating a second value of a second semaphore.

9. The computer-implemented method of claim 5, comprising:
   identifying the first data movement task based on a first data movement request;
   allocating the first data movement request to a first data movement request handling thread;
   identifying the second data movement task based on a second data movement request; and
   allocating the second data movement request to a second data movement request handling thread.

10. The computer-implemented method of claim 9, wherein allocating the first data movement request to the first data movement request handling thread includes placing the first data movement request in a first data movement request queue, and wherein allocating the second data movement request to the second data movement request handling thread includes placing the second data movement request in a second data movement request queue.

11. The computer-implemented method of claim 10, wherein data movement requests are placed in the first data movement request queue and the second data movement request queue in a round robin manner.

12. The computer-implemented method of claim 9, comprising:
   identifying a third data movement task based on a third data movement request; and
   allocating the third data movement request to a third data movement request handling thread.

13. The computer-implemented method of claim 5, wherein performing the sync operation in the sync phase of the first data movement task includes writing to synchronization logic of a component of an integrated circuit device comprising the DMA engine.

14. The computer-implemented method of claim 13, wherein the integrated circuit device is an acceleration engine.

15. The computer-implemented method of claim 13, wherein the component is a processing engine array, activation engine, vector engine, or pooling engine of an accelerator of the integrated circuit device.

16. A non-transitory computer-readable medium having stored therein instructions that, when executed by one or more processors, cause a direct memory access (DMA) engine to:
   identify a first data movement task based on a first data movement request;
   identify a second data movement task based on a second data movement request;

perform one or more data movement operations in a data movement phase of the first data movement task;

during a wait period for a sync phase of the first data movement task, initiate a data movement phase of the second data movement task;

initiate the sync phase of the first data movement task following the wait period for the sync phase of the first data movement task; and perform a sync operation in the sync phase of the first data movement task.

17. The non-transitory computer-readable medium of claim 16, further having stored therein instructions that, when executed by the one or more processors, cause the DMA engine to:

perform one or more data movement operations in the data movement phase of the second data movement task; and initiate the sync phase of the first data movement task following expiration of the wait period for the sync phase of the first data movement task and during a wait period for a sync phase of the second data movement task.

18. The non-transitory computer-readable medium of claim 17, further having stored therein instructions that, when executed by the one or more processors, cause the DMA engine to:

initiate the sync phase of the second data movement task following the wait period for the sync phase of the second data movement task; and perform a sync operation in the sync phase of the second data movement task.

19. The non-transitory computer-readable medium of claim 18, wherein performing the sync operation in the sync phase of the first data movement task includes incrementing a first semaphore, and wherein performing the sync operation in the sync phase of the second data movement task includes incrementing a second semaphore.

20. The non-transitory computer-readable medium of claim 16, further having stored therein instructions that, when executed by the one or more processors, cause the DMA engine to:

allocate the first data movement request to a first data movement request handling thread by placing the first data movement request in a first data movement request queue; and allocate the second data movement request to a second data movement request handling thread by placing the second data movement request in a second data movement request queue.

* * * * *